(12) United States Patent
Abraham et al.

(10) Patent No.: US 7,764,713 B2
(45) Date of Patent: Jul. 27, 2010

(54) SYNCHRONIZATION WATERMARKING IN MULTIMEDIA STREAMS

(75) Inventors: Cherian Abraham, North Ryde (AU); Timothy Connal Delaney, Normanhurst (AU); Nevill Inglis, Castle Hill (AU); Karen Phelan, Abbotsford (AU); Luke Anthony Tucker, Beacon Hill (AU)

(73) Assignee: Avaya Inc., Basking Ridge, NJ (US)

( * ) Notice: Subject to any disclaimer, the term of this patent is extended or adjusted under 35 U.S.C. 154(b) by 950 days.

(21) Appl. No.: 11/238,872

(22) Filed: Sep. 28, 2005

(65) Prior Publication Data

US 2007/0071037 A1    Mar. 29, 2007

(51) Int. Cl.
    *H04J 3/06* (2006.01)
(52) U.S. Cl. .................. 370/510; 370/503; 370/504
(58) Field of Classification Search .......... 370/503, 370/504, 505, 506
See application file for complete search history.

(56) References Cited

U.S. PATENT DOCUMENTS

| | | | | |
|---|---|---|---|---|
| 5,818,532 | A * | 10/1998 | Malladi et al. | 375/240.03 |
| 6,359,656 | B1 * | 3/2002 | Huckins | 348/512 |
| 6,480,902 | B1 * | 11/2002 | Yuang et al. | 709/248 |
| 6,584,125 | B1 * | 6/2003 | Katto | 370/537 |
| 6,680,955 | B1 * | 1/2004 | Le | 370/477 |
| 6,754,279 | B2 * | 6/2004 | Zhou et al. | 375/240.28 |
| 6,792,047 | B1 * | 9/2004 | Bixby et al. | 375/240.26 |
| 7,120,168 | B2 * | 10/2006 | Zimmermann | 370/503 |
| 7,130,316 | B2 * | 10/2006 | Kovacevic | 370/509 |
| 7,228,055 | B2 * | 6/2007 | Murakami et al. | 386/52 |
| 7,400,653 | B2 * | 7/2008 | Davies et al. | 370/493 |
| 7,499,469 | B2 * | 3/2009 | Fu et al. | 370/466 |
| 2001/0041983 | A1 | 11/2001 | Tedd | |
| 2003/0235216 | A1 * | 12/2003 | Gustin | 370/509 |
| 2004/0001597 | A1 | 1/2004 | Marton | |
| 2004/0098365 | A1 | 5/2004 | Comps et al. | |
| 2004/0100582 | A1 | 5/2004 | Stanger | |
| 2004/0220812 | A1 | 11/2004 | Bellomo et al. | |
| 2005/0117056 | A1 * | 6/2005 | Aprea et al. | 348/462 |
| 2005/0195846 | A1 * | 9/2005 | Sano et al. | 370/412 |

(Continued)

FOREIGN PATENT DOCUMENTS

EP    1189446    3/2002

(Continued)

OTHER PUBLICATIONS

European Search Report for European Patent Application No. 06254463.0, mailed Mar. 6, 2007.

(Continued)

*Primary Examiner*—Ricky Ngo
*Assistant Examiner*—Ben H Liu
(74) *Attorney, Agent, or Firm*—Sheridan Ross P.C.

(57) ABSTRACT

Synchronization of related packet data network streams is provided. Synchronization is achieved by inserting synchronization packets into data streams that are to be aligned with one another after transmission of those data streams across a network. More particularly, corresponding synchronization packets are inserted into the corresponding data streams at the same time, to serve as markers for performing synchronization of the data at the receiving end. The corresponding data streams may comprise an audio data stream and a corresponding video data stream.

16 Claims, 5 Drawing Sheets

U.S. PATENT DOCUMENTS

| | | | | |
|---|---|---|---|---|
| 2005/0238057 A1* | 10/2005 | Toma et al. | ............... | 370/503 |
| 2005/0259694 A1* | 11/2005 | Garudadri et al. | ........... | 370/503 |
| 2005/0276282 A1* | 12/2005 | Wells et al. | ............... | 370/503 |
| 2006/0072627 A1* | 4/2006 | Kugumiya et al. | ........... | 370/503 |
| 2008/0137690 A1* | 6/2008 | Krantz et al. | ............... | 370/503 |

FOREIGN PATENT DOCUMENTS

| | | |
|---|---|---|
| GB | 2334854 | 9/1999 |
| JP | S59-23699 | 2/1984 |
| JP | S60-28700 | 2/1985 |
| JP | H4-49728 | 2/1992 |
| JP | 2003-298644 | 10/2003 |
| WO | 2005/011281 | 2/2005 |

OTHER PUBLICATIONS

*Track-reading and Lipsync*; SyncMagic; Internet Web Site: http://www.syncmagic.com/technology.html; 1 page; printed Apr. 12, 2005.

*MAC100—Expanding the Reach of High Quality Video Communications*; AHEAD Communications; Internet Web Site: www.aheadcomusa.com; MAC100_3_04; 3 pages; no date.

*Avistar® H.320/H.323 Video Gateway*; Avistar Communiations Corporation; Internet Web Site: www.avistar.com; one page; 2003.

*Tandbert 1000*; TANDBERG; Internet Web Site: www.TANDBERG.net; two pages; Jun. 2004.

Examination Report for European Patent Application No. 06254463.0, mailed Nov. 6, 2007, pp. 1-3.

Notification of the First Office Action (including translation) for Chinese Patent Application No. 200610151825.9, mailed Mar. 27, 2009.

Examiner Office Letter (including translation) for Japanese Patent Application No. 2006-264768, mailed May 20, 2009.

Examiner's Refusal Decision (including translation) for Japanese Patent Application No. 2006-264768, mailed Sep. 7, 2009.

Notification of the Second Office Action (including translation) for Chinese Patent Application No. 200610151825.9, mailed Oct. 9, 2009.

Notification to Grant the Patent Right for Chinese Patent Application No. 200610151825.9, dated Apr. 1, 2010.

Official Action for Canadian Patent Application No. 2,552,769, mailed Mar. 16, 2010.

* cited by examiner

SYNCHRONIZATION WATERMARKING IN MULTIMEDIA STREAMS

FIELD OF THE INVENTION

The synchronization of separate but related data streams is provided. More particularly, synchronization data packets are inserted into streams of data packets to allow related streams to be time-aligned with one another.

BACKGROUND OF THE INVENTION

Multimedia data, for example comprising audio and video components, is useful for delivering content for entertainment and enhanced communications between remote parties. For example, video telephony systems are increasingly popular as a way to conduct meetings between persons at remote locations. As high-speed Internet protocol networks have become more widely available, lower cost video conferencing equipment has become available, making such equipment more accessible. However, because packet data networks send audio and video information separately, and because of various network effects, it is not uncommon for audio streams and associated video streams to become noticeably unsynchronized from one another. This problem is particularly apparent in connection with audio/video information that is transmitted across long distances over IP networks.

At present, most media gateways do not provide for the synchronization (or "lipsync") of related audio and video streams. In addition, most media gateways do not use delayed compensation or lipsync buffering of some sort. Through real time-control protocol (RTCP), a mapping from real-time protocol (RTP) time stamps to network time protocol (NTP) time stamps/wall clock is possible. However, the information is not available at the right time to compensate for drift between audio and video streams. In particular, RTP time stamps available in the RTP header are not wall clock time stamps and the time stamps for audio and video need not necessarily start from the same count or follow a particular scheme. For example, audio time stamps may increase by 160 for every packet depending on the sampling and the packets for the video which belong to the same frame may not increase the time stamp value at all. Mapping RTP time stamps to NTP time stamps is not adequate, as the RTCP sender reports are not frequent enough and are not available at the necessary time for delay compensation. Furthermore, if there are multiple synchronization sources present, synching using RTCP is not practical. Accordingly, there is no clear solution for resolving lipsync issues in Internet protocol (IP) networks.

Certain products are available that claim to provide lipsync features through lipsync buffering. These may or may not depend on the RTP/RTCP time stamps available in the RTP/RTCP header. In some cases, especially in professional broadcast video solutions, lipsync based on phonetics and pattern recognition may be used. More particularly, systems have been proposed that detect an audio event in an audio portion of a media-program signal, and that measure the timing interval from the audio event to a subsequent video synchronization pulse in the video portion of the media program signal. The timing interval is stored in a third portion of the media program signal. At a receiving end, the timing interval information is retrieved, and used to align the audio event to the video synchronization pulse. However, such systems are relatively complex to implement.

Motion Picture Experts Group Standard 4 (MPEG4) provides sync and multiplexing layers. However, the sync and multiplexing layers are not actually implemented in most systems. In particular, those systems that support MPEG4 video usually implement only the compression layer part of the standard, and not the sync layer or the delivery layer. As a result, the MPEG4 compressed video RTP streams have no common reference count or time stamp when used with audio RTP streams, unless all the MPEG4 layers are implemented in the common framework. Implementing all layers in embedded endpoints is not cost effective, and in any event, many standards require other video codecs like H.261, H.263, etc. Accordingly, using the MPEG4 standard for synchronization in connection with multimedia calls placed over IP networks is impractical.

SUMMARY OF THE INVENTION

Embodiments of the present invention are directed to solving these and other problems and disadvantages of the prior art. In accordance with embodiments of the present invention, synchronization is provided by inserting synchronization packets in related audio and video data streams. The synchronization packets feature packet data header information that allows each synchronization packet to be sent as part of the data stream to which it corresponds. Unlike a data packet, the payload of a synchronization packet includes a synchronization flag to facilitate detection of synchronization packets within the data streams. Optionally, the payload of a synchronization packet may also include timing and/or identifier information.

In accordance with embodiments of the present invention, synchronization packets are inserted into corresponding audio and video data streams at a sending endpoint or gateway, and are used to perform synchronization of the related audio and video data streams at a receiving endpoint or gateway. It is not required that the insertion of synchronization packets into the audio and video data streams be performed at the sending endpoint or the gateway closest to the sending endpoint. That is, at least some benefit in the form of improved synchronization can be obtained by inserting synchronization packets at, for example, gateways or other network nodes along a communication pattern. Likewise, the detection of synchronization packets and the alignment of audio and video streams based on the detection of synchronization packets need not be performed at the receiving endpoint or at the last gateway through which the data streams travel. However, it is generally beneficial to insert synchronization packets and perform synchronization based on such packets in network nodes that handle substantially all of the packets comprising the data streams, such as in the communication endpoints themselves, in gateways immediately proximate to the communication endpoints, or in gateways that connect, for example, sub networks to long distance networks.

Additional features and advantages of embodiments of the present invention will become more readily apparent from the following discussion, particularly when taken together with the accompanying description.

DETAILED DESCRIPTION

Figure 1:
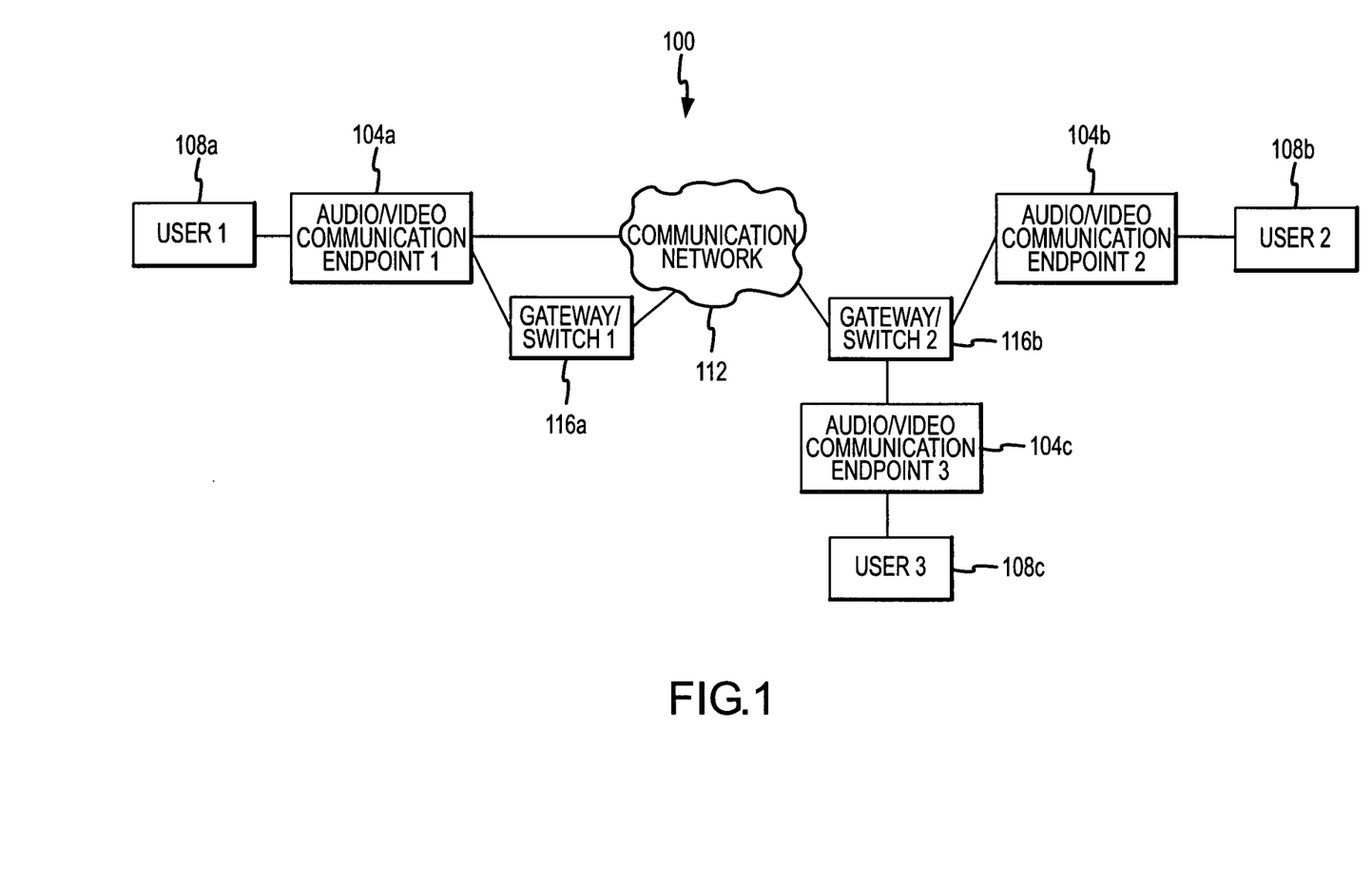
FIG. 1 is a block diagram depicting components of a communications system in accordance with embodiments of the present invention.

With reference to FIG. 1, components of a communication system 100 in accordance with embodiments of the present invention are illustrated. In general, the communication system 100 includes a number of audio/video communication endpoints 104. Each of the audio/video communication endpoints 104 may be associated with one or more users 108. The audio/video communication endpoints 104 are generally placed in communication with one another by a communication network 112 and/or one or more gateways or switches 116.

In general, an audio/video communication endpoint 104 may comprise video telephones, soft video telephones, or other devices, such as general purpose computers, personal digital assistants (PDA's), cellular telephones, televisions, or any other device capable of receiving as input or providing as output audio/video data. As can be appreciated by one of skill in the art after consideration of the disclosure provided herein, an audio/video communication endpoint 104 need not be capable of handling packet data media streams, provided that it is paired with another device, such as a gateway or switch 116 with or without intermediate devices, that is capable of handling IP packet data streams and providing an output suitable for the audio/video communication endpoint 104.

The communication network 112 may comprise one or more networks of various types. For example, the communication network 112 may comprise a local area network (LAN), or wide area network (WAN). More generally, the communication network 112 may comprise any type of Internet protocol network or other packet data network. Furthermore, a portion of a communication network 112 may comprise a non-packet data network, such as the public switched telephony network (PSTN). In addition, the communication network 112 may function to interconnect various network nodes, such as audio/video communication endpoints 104 and gateway/switches 116, either directly or by interconnecting a subnetwork to another subnetwork or to a network node.

A gateway/switch 116 is typically interconnected to the communication network 112, and may define a subnetwork or system. For example, the first gateway/switch 116 may define a local area network or local telephony network, such as a private branch exchange, that includes the first audio/video communication endpoint 104. As shown, the audio/video communication endpoint may also be directly interconnected to the communication network 112. As a further example, the second gateway/switch 116 may provide an interconnection to the communication network 112 for the second audio/video communication endpoint 104 and the third audio/video communication endpoint 104. Accordingly, examples of gateway/switches 116 include Internet protocol network gateways or routers, private branch exchange or other communication management servers, or Internet protocol switches.

Figure 2:
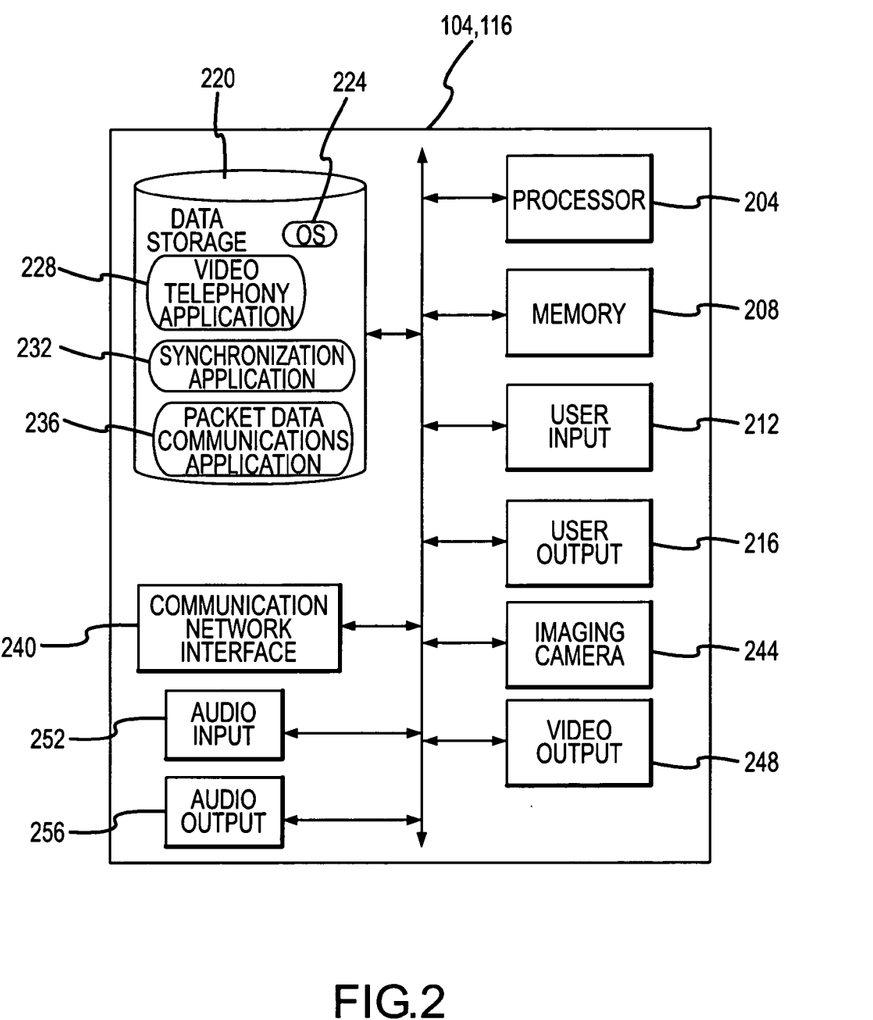
FIG. 2 is a functional block diagram depicting components of a communication endpoint or gateway in accordance with embodiments of the present invention.

With reference now to FIG. 2, components that may be included as part of an audio/video communication endpoint 104 or a gateway/switch 116 capable of performing synchronization of related data streams are depicted in block diagram form. The components may include a processor 204 capable of executing program instructions. Accordingly, the processor 204 may include any general purpose programmable processor or controller for executing application programming. Alternatively, the processor 204 may comprise a specially configured application specific integrated circuit (ASIC) or digital signal processor (DSP). The processor 204 generally functions to run programming code implementing various functions performed by the audio/video communication endpoint 104 and/or gateway/switch 116, including media stream synchronization functions as described herein.

An audio/video communication endpoint 104 and/or gateway/switch 116 may additionally include memory 208 for use in connection with the execution of programming by the processor 204 and for the temporary or long-term storage of data or program instructions. The memory 208 may comprise solid-state memory resident, removable or remote in nature, such as DRAM and SDRAM. Where the processor 204 comprises a controller, the memory 208 may be integral to the processor 204.

In addition, various user input devices 212 and user output devices 216 may be provided. Examples of input devices 212 include a keyboard, numeric keypad, microphone, still or video camera, and pointing device combined with a screen or other position encoder. Examples of user output devices 216 include a video display, an alphanumeric display, ringer, printer port, speaker or indicator lights.

An audio/video communication endpoint 104 and/or a gateway/switch 116 may also include data storage 220 for the storage of application programming and/or data. For example, operating system software 224 may be stored in the data storage 220. An example of an application that may be stored in data storage 220, particularly in connection with an audio/video communication endpoint 104, is a video telephony or communication application 228. As can be appreciated by one of skill in the art, a video telephony application 228 may comprise instructions for implementing a soft video telephone, for example where an audio/video communication endpoint 104 comprises a general purpose computer. As a further example, a video telephony application 228 may comprise operating instructions that are executed by an audio/video communication endpoint 104 comprising a dedicated video telephony endpoint or device. Examples of other applications that may be stored in data storage 220 provided as part of an audio/video communication endpoint 104 or gateway/switch 116 include a synchronization application 232 and a packet data communications application 236. A synchronization application 232 may comprise instructions for inserting synchronization packets in outgoing multimedia data streams and detecting synchronization packets and performing synchronization with respect to incoming multimedia data streams, as described herein. A packet data communications application 236 may comprise instructions for sending or receiving packet data streams across a packet data network, such as an Internet protocol communication network 112. For example, a packet data communication application 236 may operate in cooperation with a video telephony application 228 an audio/video communication endpoint 104 to send and receive multimedia data streams between a user 108 of the audio/video communication endpoint 104 and the communication network 112. The data storage 220 may comprise a magnetic storage device, a solid-state storage device, an optical storage device, a logic circuit or any combination of any such devices. It should further be appreciated that the programs and data that may be maintained in the data storage 220 can comprise software, firmware or hardware logic, depending on the particular implementation of the data storage 220.

An audio/video communication endpoint 104 and/or a gateway/switch 116 may also include one or more communication network interfaces 240. For example, an audio/video communication endpoint 104 or gateway/switch 116 may include a communication network interface 240 comprising a network interface card (NIC), a modem, a telephony port, a serial or parallel data port, or other wire line or wireless communication network interface.

In addition, an audio/video communication endpoint 104 generally includes one or more imaging cameras 244. The camera 244 functions to obtain an image of persons using the audio/video communication endpoint 104 to participate in a video telephony session. The imaging camera 244 may comprise a digital camera having optical elements, such as a lens system with selectable zoom and/or focus capabilities, and electronic elements, such as a charge coupled device (CCD) for converting video information collected by the optical elements into digital image data. Accordingly, an imaging camera 244 comprises a particular type of user input 212.

An exemplary audio/video communication endpoint 104 also generally includes a video output or display device 248. The video output 248 may be used to display image information from one or more remote audio/video communication endpoints 104. In addition, control and status information may be presented through the video output 248. Accordingly a video output 248 can be considered a specific type of user output 216. Examples of a video output 248 include a cathode ray tube (CRT), liquid crystal display (LCD), plasma display or other device capable of reproducing transmitted video images.

In connection with the support of audio communications, an audio/video communication endpoint 104 may include an audio input 252 and an audio output 256. The audio input 252 may comprise a microphone for receiving audio information from the location of the audio/video communication endpoint 104, including speech from persons at that location. Accordingly, an audio input 252 is a particular type of user input 212. The audio output 256 may include one or more speakers or headphones. Accordingly, the audio output 256 is a particular type of user output 216.

As can be appreciated by one of skill in the art from the description provided herein, the particular components that are included as part of an audio/video communication endpoint 104 or a gateway/switch 116 will generally be determined by those components and functions necessary to support the included features of a particular audio/video communication endpoint 104 or gateway/switch. Accordingly, a particular audio/video communication endpoint 104 or gateway/switch 116 need not include each of the components and applications illustrated in FIG. 2. Furthermore, included components and applications can be implemented as part of a single physical device, or distributed among physically or logically separate components.

Figure 3:
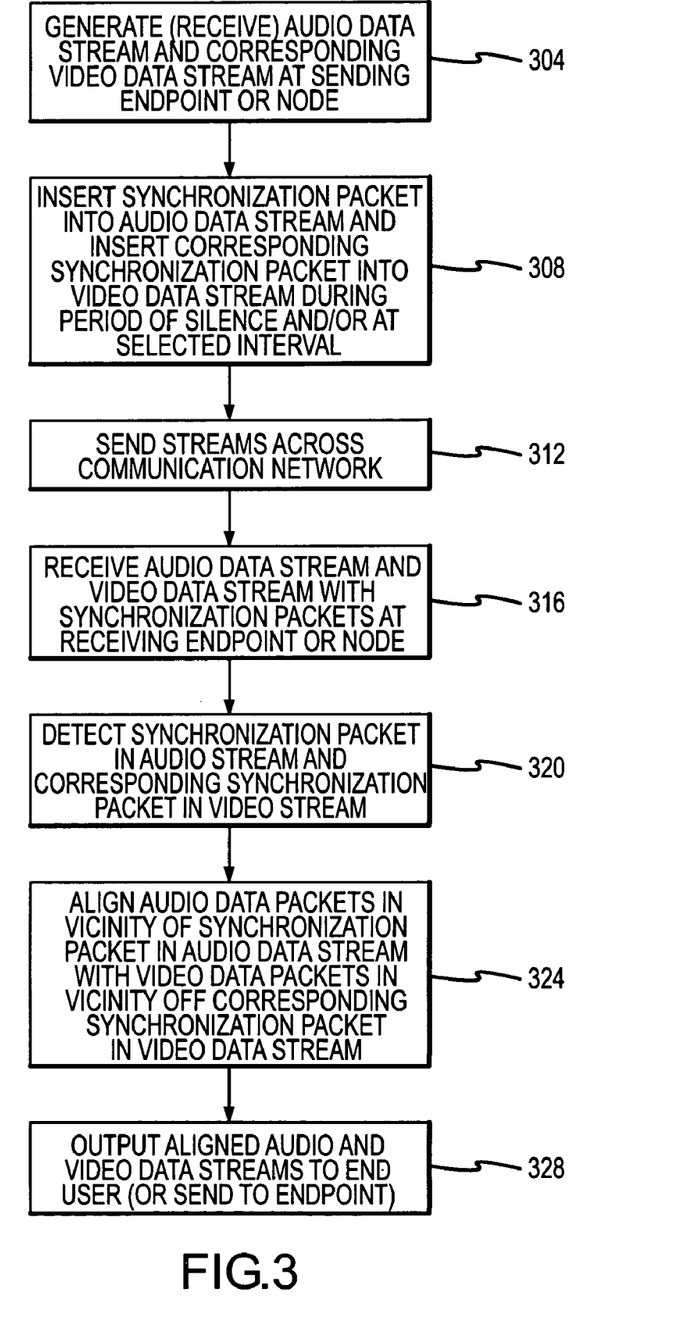
FIG. 3 is a flowchart depicting aspects of the operation of a system in accordance with embodiments of the present invention.

With reference now to FIG. 3, aspects of a process for synchronizing packet data streams are illustrated. Initially, an audio data stream and a corresponding video data stream are generated or received at a sending audio/video communication endpoint 104 or other network node, such as a gateway/switch 116 (step 304). The generation of audio and video data streams can comprise receiving audio and video information from an audio input 252 such as a microphone and an imaging camera 244, and generating a packetized stream of data. For example, the data streams may be formatted according to the real time protocol (RTP).

Receiving an audio data stream and corresponding video data stream may comprise, for example, a gateway/switch 116 that receives packet data streams comprising the audio and video data streams from an audio/video endpoint 104 or from another network node. At step 308, a synchronization packet is inserted into the audio data stream and a corresponding synchronization packet is inserted into the video data stream. The pair of corresponding synchronization packets may be inserted into the respective audio and video data streams simultaneously. In accordance with further embodiments of the present invention, the first and second synchronization packets may be inserted into the audio and video data streams at slightly different times, for example within about 200 milliseconds of one another. In accordance of still other embodiments of the present invention, the first synchronization packet is inserted in the audio data stream at a first time and the second synchronization packet is inserted in the video data stream at a second time that is exactly the same as the first time. Synchronization packets may be inserted in data streams when silence is detected in the audio data stream, or after the appropriate video frame boundaries, such that inclusion of the synchronization packets will not cause errors at the receiving device or decoder. The synchronization packets that are inserted into the audio and video data streams are generally formatted like the data packets containing the audio or video data. Accordingly, where the audio and video data streams comprise RTP packets, the synchronization packets inserted into those streams generally comprise an RTP header. As a payload, the synchronization packets contain a synchronization flag. The synchronization flag may be selected for good correlation properties. By providing a synchronization flag with good correlation properties, the processing power required to detect the flag can be much less than if each data packet must be read to determine whether it is a synchronization packet. In addition, the synchronization flag can be selected such that the probability that the flag will be emulated by audio or video data is low. The synchronization packets may additionally include a reference value such as a wall clock value, a count value, or a common reference value. A reference value may further comprise a difference or delta between the time a synchronization packet is inserted in the first data stream and the time a corresponding synchronization packet is inserted in the second data stream. At step 312, the audio and video streams, with the included synchronization packets, are sent across the communication network 112. As can be appreciated by one of skill in the art, packet data streams are subject to various network effects that cause individual packets to arrive at a receiving end out of sequence.

The audio and video data streams, with the synchronization packets, are received at a receiving endpoint or node capable of performing synchronization (step 316). In particular, the receiving audio/video communication endpoint 104 or node, such as a gateway/switch 116 detects a synchronization packet in the audio stream and a corresponding synchronization packet in the video stream (step 320). In accordance with embodiments of the present invention, a fast correlation is performed on all incoming packets to determine if a particular packet is a synchronization packet. Accordingly, synchronization packets in accordance with embodiments of the present invention may be detected by scanning incoming packets for correlation, as opposed to reading each packet.

In accordance with embodiments of the present invention, synchronization packets are inserted into audio and video data streams from time to time, with the time between successive synchronization packets being less than some threshold amount. In accordance with still other embodiments of the present invention, synchronization packets are inserted into audio and video data streams at least every 100 milliseconds. With such spacing between synchronization packets, it is not a requirement that a synchronization packet include a reference value. That is, a synchronization packet in one of the data streams can be identified as corresponding to another synchronization packet in the other data stream if those synchronization packets are received at the receiving end at about the same time (e.g. within about 100 milliseconds of one another). That is, it can be assumed that network delays of greater than two to three seconds are extremely unlikely.

After detecting and identifying corresponding synchronization packets in the audio and video data streams, the audio and video data streams can be aligned (step 324). More particularly, the audio packets in the vicinity of the synchronization packet detected in the audio data stream can be aligned with the video data packets in the vicinity of the corresponding synchronization packet in the video data stream. Alignment of the data packets may comprise buffering data packets at the receiving end or node and realigning the data packets. In accordance with the embodiments of the present invention, alignment may be performed only if the data packets are determined to be out of alignment by more than some threshold amount. For example, a misalignment of less than a few milliseconds is generally too little for a user 108 to perceive. However, misalignments become very apparent when they exceed 100 milliseconds. Accordingly, alignment may be performed where the amount of misalignment is determined to exceed 100 milliseconds. That is, exact alignment between data packets in the audio and video data streams or information in those data streams (or the playback of those data streams) is not required. Instead, alignment of the data stream packets such that the respective outputs from those data streams are, for example, within about 100 milliseconds or less of perfect alignment is adequate. Other thresholds for alignment can also be applied in accordance with embodiments of the present invention, for example to meet the synchronization requirements of a particular application. For example, any amount of misalignment can be corrected.

Where synchronization packets do not include a time value, alignment can be performed based on the assumption that the synchronization packets were inserted into the audio and video data streams at or about the same time (e.g. within about 100 milliseconds of one another). Alternatively a reference value included in the synchronization packet can be used to provide a relative time of insertion different between corresponding synchronization packets. The aligned audio and video data streams are then output to the end user, or sent to an audio/video input 104 for output, for example if alignment is performed at a gateway/switch 116.

Figure 4:
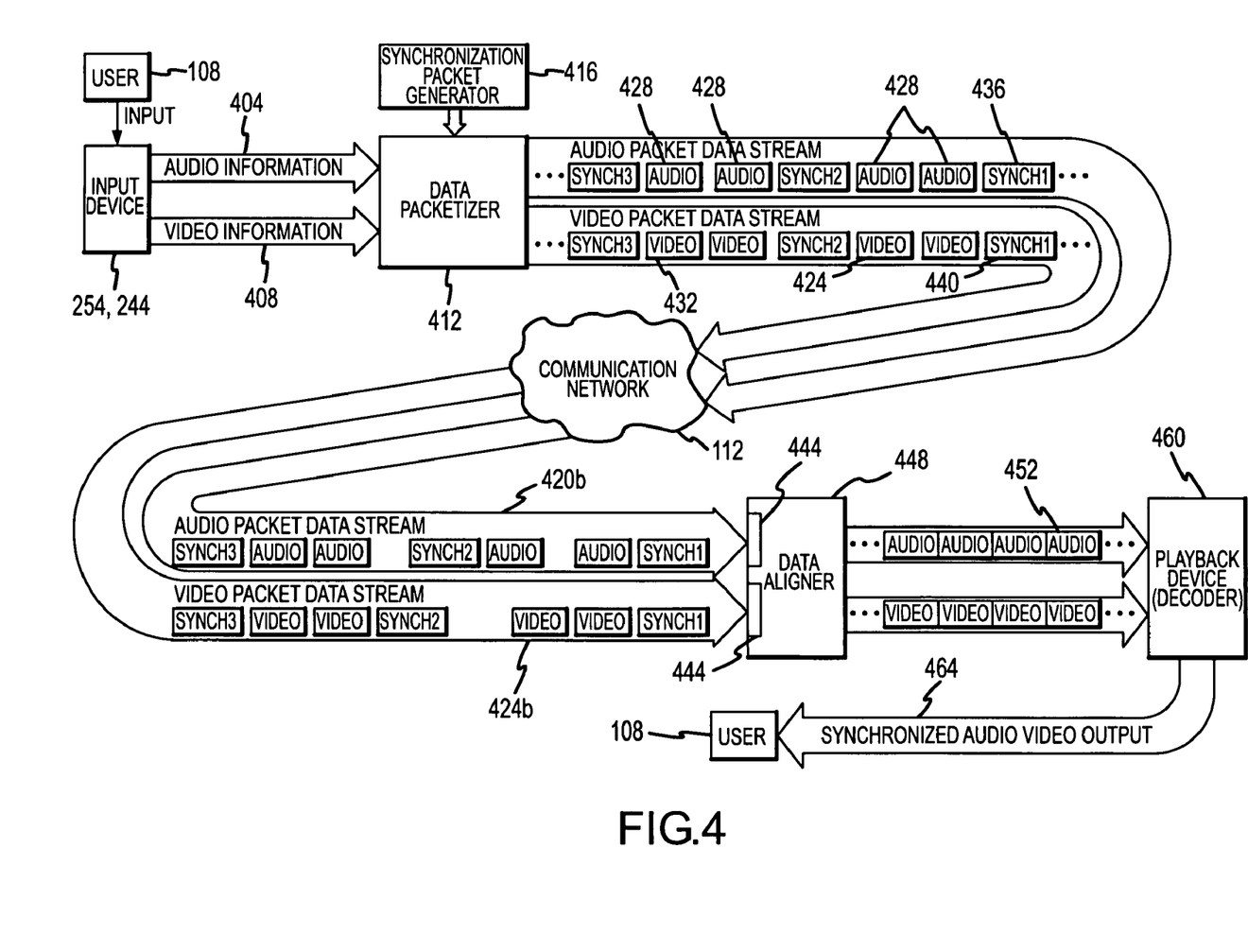
FIG. 4 is a process flow diagram depicting aspects of the synchronization of audio and video data streams in accordance with embodiments of the present invention.

With reference now to FIG. 4 additional aspects of embodiments of the present invention are illustrated. In particular, the process of sending synchronized data streams starts with providing input comprising audio and video information to an input device, such as an audio input 252 comprising a microphone in the case of audio information and an imaging camera 244 in the case of video information. The resulting audio information signal 404 and video information signal 408 may then be sent to a data packetizer 412. The data packetizer 412 may comprise a processor 204 executing a packet data communications application 236 in cooperation with memory 208 and data storage 220 provided as part of an audio/video communication endpoint 104. In addition, the data packetizing may comprise or be associated with one or more analog to digital converters (ADC). Alternatively, the audio information 404 and video information 408 signals may be provided to a gateway/switch 116 for packetization. A synchronization packet generator 416 operates in conjunction with the data packetizer 412 to insert synchronization packets in the packet data streams created by the data packetizer 412 from the audio 404 and video 408 information. Accordingly, interaction of the synchronization packet generator 416 and the data packetizer 412 results in the creation of an audio packet data stream 420 and a corresponding video data packet stream 424. Each of the audio packet 420 and video packet 424 data streams includes audio data packets 428 or video data packets 432 respectively. In addition, the audio packet data stream 420 includes a synchronization packet 436 that corresponds to a synchronization packet 440 inserted in the video packet data stream 424.

The audio packet data stream 420 and the video packet stream 424 are transmitted across the communication network to a receiving node or endpoint 104 or 116. Initially, the audio packet data stream 420a and the video packet data stream 424a are aligned. However, after passing through the communication network 112, the audio packet data stream 420 and the video packet data stream 424 contain data 428, 432 and synchronization 436, 440 packets that are no longer aligned with one another. The audio and video data packet streams 420, 424 are received in buffers 444, for example provided as part of the memory 208 of a receiving audio/video communication endpoint 104 or gateway/switch 116.

A data aligner 448 detects the synchronization packets 436, 440 in the data streams 420, 424 and uses the synchronization packets 436, 440 as markers for aligning nearby data packets 428, 432 with one another. In addition, the data aligner 448 should remove the synchronization packets 436, 440. The aligned audio data stream 452 and the aligned video data stream 456 are then sent to a playback device or decoder 460. The data aligner 448 may comprise a synchronization application 232 in accordance with embodiments of the present invention, operating in cooperation with the packet data communications application 236, comprising instructions executed by a processor 204 running on the receiving audio/video communication endpoint 104 or gateway/switch 116. A playback device or decoder 416 may then provide a synchronized audio/video output 464 to the receiving user 108. The playback device 460 may be implemented by operation or execution of a video telephony application 228 or other multimedia application, by an audio/video communication endpoint 104, and may include an audio output 256 and a video output 248. Furthermore, this synchronized audio/video output 464 may be provided by a speaker comprising an audio output 256 and a display comprising a video output 248. The data aligner 248 on the playback device or decoder 416 may include or be associated with one or more digital to analog converts (DACs).

Figure 5:
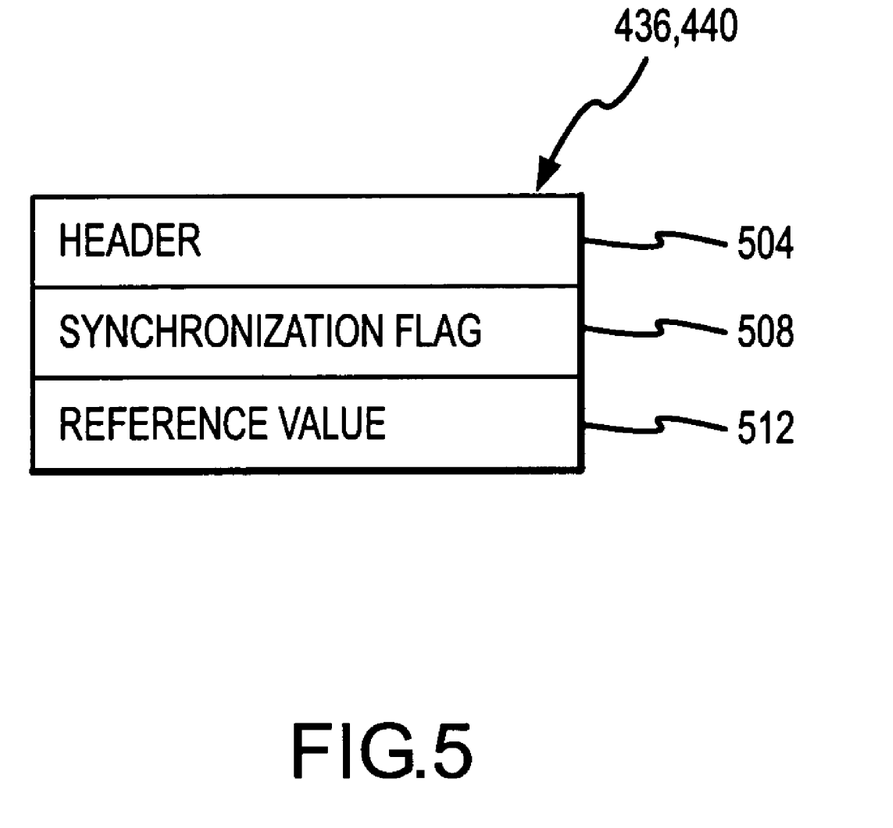
FIG. 5 depicts the contents of a synchronization packet in accordance with embodiments of the present invention.

With reference now to FIG. 5, an example synchronization packet 436, 440 in accordance with embodiments of the present invention is shown. The synchronization packet 436, 440 includes a header 504. The header 504, as can be appreciated by one of skill in the art, provides addressing information, and associates the synchronization packet 436, 440 with data packets 428, 432 of the data stream 420, 424 in which the synchronization packet 436, 440 is inserted, in order to allow the packets to be properly ordered at the receiving end. In accordance with embodiments of the present invention, the header may comprise an RTP header, or other header used in connection with transmission control protocol/Internet protocol (TCP/IP) packet data transmissions. In addition, the synchronization packet 436, 440 includes a synchronization flag 508. In accordance with embodiments of the present invention, the synchronization flag is selected so that it has good correlation properties and a low probability of emulation by data packets 428, 432. As a result, the detection of synchronization packets 436, 440 can be performed using correlation procedures, rather than requiring that each packet that is received be read to determine whether it is a synchronization packet 436,440. As an example, the synchronization flag 508 may comprise two bytes. In accordance with further embodiments of the present invention, the bytes may have a value of 0xE14D, or the binary value 1110000101001101.

Also shown is the inclusion of a reference value 512 in the payload of the illustrated synchronization packet 436, 440. The inclusion of a reference value 512 may be used to allow for a positive identification of corresponding synchronization packets 436, 440 in corresponding audio and video data streams 420, 424. The reference value 512 may be in the form of a wall clock value comprising a time stamp that is added to the synchronization packet 436, 440 upon insertion into its respective data stream, a count value, or some other common reference value. However, embodiments of the present invention do not require that the synchronization packets 436, 440 include a reference value of 512.

Although embodiments of the present invention have used as examples scenarios involving the transmission of video telephony signals across Internet protocol networks, embodiments of the present invention are not so limited. For example, synchronization as described herein can be performed in connection with the broadcasting (or web casting) of audio data streams and related video data streams. Furthermore, embodiments of the present invention have application to the synchronization of any related data streams, and can be applied in connection with any packet data transmission protocol. Furthermore, it should be appreciated that embodiments of the present invention may be applied in connection with multipoint videoconferencing scenarios.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described herein above are further intended to explain the best mode presently known of practicing the invention and to enable others skilled in the art to utilize the invention in such or in other embodiments and with the various modifications required by their particular application or use of the invention. It is intended that the appended claims be construed to include alternative embodiments to the extent permitted by the prior art.

What is claimed is:

1. A method for synchronizing packet data streams, comprising:
    generating a first synchronization packet, wherein said first synchronization packet has a payload that includes a synchronization flag;
    inserting said first synchronization packet in a first data stream;
    generating a second synchronization packet, wherein said second synchronization packet has a payload that includes a synchronization flag, and wherein said second synchronization packet corresponds to said first synchronization packet;
    inserting said second synchronization packet in a second data stream, wherein said first and second data streams are related to one another,
    wherein said generating first and second synchronization packets and inserting said first and second synchronization packets in first and second data streams respectively is performed at a first network entity;
    at a second network entity:
        generating a third synchronization packet, wherein said third synchronization packet has a payload that includes a synchronization flag;
        inserting said third synchronization packet in a third data stream;
        generating a fourth synchronization packet, wherein said fourth synchronization packet has a payload that includes a synchronization flag; and
        wherein said fourth synchronization packet corresponds to said third synchronization packet;
        inserting said fourth synchronization packet in a fourth data stream;
    at a third network entity:
        receiving said first, second, third and fourth data streams;
        detecting in said first data stream said first synchronization packet;
        detecting in said second data stream said second synchronization packet;
        determining that said first and second synchronization packets correspond to one another;
        aligning packets included in said first data stream in a vicinity of said first synchronization packet with packets included in said second data stream in a vicinity of said second synchronization packet;
        detecting in said third data stream said third synchronization packet;
        detecting in said fourth data stream said fourth synchronization packet;
        determining that said third and fourth synchronization packets correspond to one another;
        aligning packets included in said third data stream in a vicinity of said third synchronization packet with packets included in said fourth data stream in a vicinity of said fourth synchronization packet.

2. The method of claim 1, further comprising:
    receiving said first and second data streams at the second network entity;
    detecting in said first data stream said first synchronization packet;
    detecting in said second data stream said second synchronization packet;
    determining that said first and second synchronization packets correspond to one another;
    aligning packets included in said first data stream in a vicinity of said first synchronization packet with packets included in said second data stream in a vicinity of said second synchronization packet.

3. The method of claim 1, wherein a synchronization packet is inserted in said first data stream periodically, and wherein a synchronization packet is inserted in said second data stream periodically.

4. The method of claim 1, wherein said payload of said first and second synchronization packets includes a reference value.

5. The method of claim 4, wherein said reference value in said first synchronization packet is within a first predetermined range of said reference value in said second synchronization packet.

6. The method of claim 4, wherein said reference value in said first synchronization packet is the same as the reference value in said second synchronization packet.

7. The method of claim 4, wherein said reference value comprises a clock value.

8. The method of claim 4, wherein said reference value comprises a count value.

9. The method of claim 1, wherein the first synchronization packet includes a header, said header of a first type includes a Real Time Protocol header.

10. The method of claim 1, wherein said synchronization flag has good correlation properties.

11. The method of claim 1, wherein a vicinity of a synchronization packet is one of: between said synchronization packet and a previous synchronization packet; between said synchronization packet and a next synchronization packet; and within a predetermined number of packets of said synchronization packet.

12. The method of claim 2, further comprising:
presenting a first audio output and a first video output generated from said aligned packets included in said first and second data streams to a user at a communication endpoint.

13. The method of claim 1, wherein said first synchronization packet is inserted in said first data stream at a first time, wherein said second synchronization packet is inserted in said second data stream at a second time, and wherein said first time is within a predetermined amount of said second time.

14. The method of claim 1, wherein said first synchronization packet is inserted in said first data stream at a first time, wherein said second synchronization packet is inserted in said second data stream at a second time, and wherein said first time is within 100 milliseconds of said second time.

15. The method of claim 1, wherein said second synchronization packet is inserted into said second data stream after a video frame boundary.

16. The method of claim 1, wherein said first synchronization packet is inserted in said first data stream when silence is detected in that data stream.

* * * * *